United States Patent [19]

Kondo et al.

[11] Patent Number: 5,079,084

[45] Date of Patent: Jan. 7, 1992

[54] REACTIVE INJECTION MOLDING OF A REINFORCED PLASTIC PRODUCT AND METHOD FOR MANUFACTURING THEREOF

[75] Inventors: Kanemitsu Kondo, Toyota; Yoshiro Umemoto, Nagoya, both of Japan

[73] Assignee: Toyota Jidosha Kabushiki Kaisha, Toyota, Japan

[21] Appl. No.: 549,621

[22] Filed: Jul. 9, 1990

Related U.S. Application Data

[63] Continuation of Ser. No. 60,417, Jun. 11, 1987, abandoned.

[30] Foreign Application Priority Data

Jul. 14, 1986 [JP] Japan .................. 61-165193

[51] Int. Cl.$^5$ ................................................ B32B 5/16
[52] U.S. Cl. .................... 428/324; 428/423.3; 428/454; 264/328.6; 264/328.18
[58] Field of Search .............. 264/328.18, 328.6; 524/789, 791, 871, 872, 873, 874, 875; 428/324, 332, 363, 454, 423.3

[56] References Cited

U.S. PATENT DOCUMENTS

| | | | |
|---|---|---|---|
| 3,441,523 | 4/1969 | Dwyer et al. | 524/875 |
| 4,369,225 | 1/1983 | Manabe et al. | 428/423.3 |
| 4,477,405 | 10/1984 | Makhlouf et al. | 264/300 |
| 4,562,215 | 12/1985 | Carter et al. | 524/425 |
| 4,564,491 | 1/1986 | Koestecki | 264/328.14 |
| 4,590,219 | 5/1986 | Nissen et al. | 264/331.19 |
| 4,598,015 | 7/1986 | Panush | 428/324 |
| 4,623,586 | 11/1986 | Umeya et al. | 524/493 |
| 4,701,475 | 10/1987 | Turner | 524/377 |
| 4,708,626 | 11/1987 | Sakai et al. | 425/398 |
| 4,720,528 | 1/1988 | Etzell et al. | 525/450 |
| 4,810,540 | 3/1989 | Ellison et al. | 428/31 |
| 4,931,324 | 6/1990 | Ellison et al. | 428/31 |

FOREIGN PATENT DOCUMENTS 60-125612  7/1985  Japan ............. 264/328.18
61-20717   7/1986  Japan .

*Primary Examiner*—Robert A. Dawson
*Assistant Examiner*—Allan R. Kuhns
*Attorney, Agent, or Firm*—Finnegan, Henderson, Farabow, Garrett & Dunner

[57] ABSTRACT

A method for the reaction injection molding of a reinforced product from a polyol or polyisocyanate, or a mixture thereof employs a flaky inorganic reinforcing material having an average flake size not exceeding 18 microns. The molded product presents a surface finish of high sharpness when painted.

2 Claims, 1 Drawing Sheet

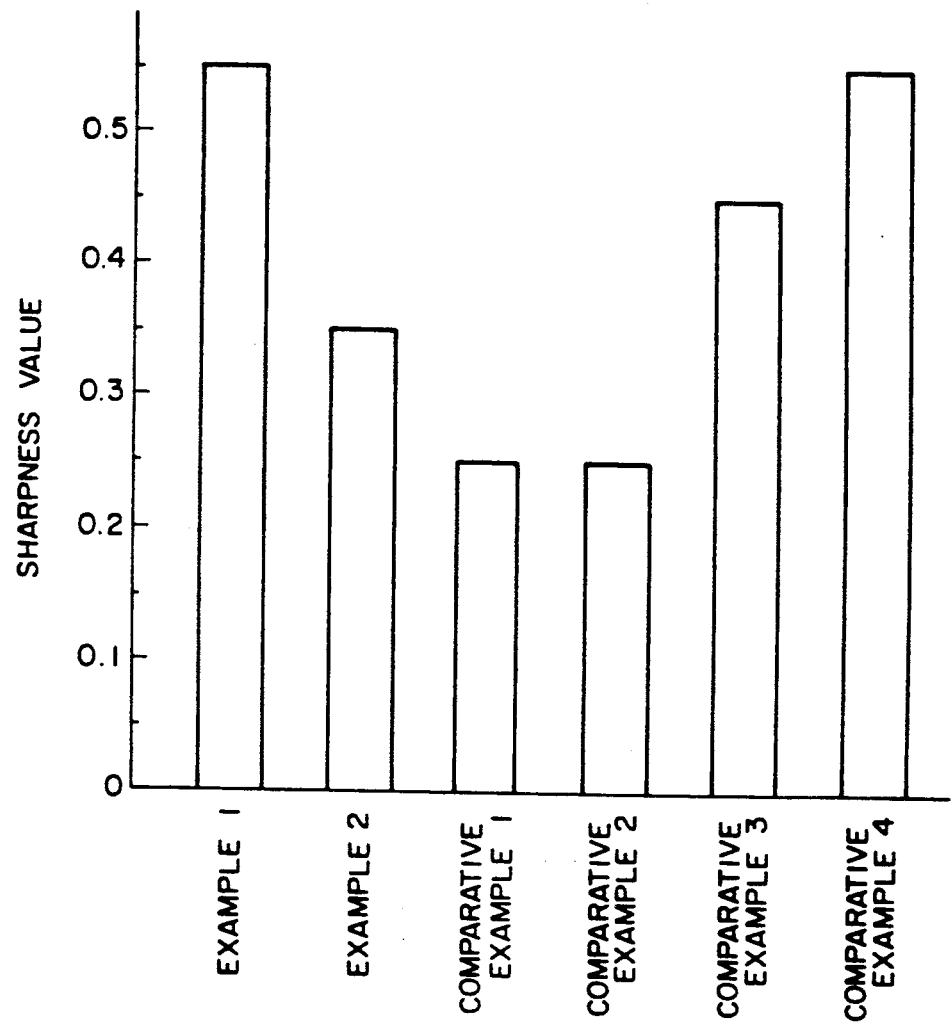

REACTIVE INJECTION MOLDING OF A REINFORCED PLASTIC PRODUCT AND METHOD FOR MANUFACTURING THEREOF

This application is a continuation of application Ser. No. 07/060,417 filed June 11, 1987 now abandoned.

BACKGROUND OF THE INVENTION

1. Field of the Invention

This invention relates to a reaction injection molding of a plastic product reinforced with a flaky inorganic reinforcing material and a method for the manufacture thereof.

2. Description of the Prior Art

When a reinforced plastic product is manufactured by a reactive injection molding method, a fibrous inorganic reinforcing material has in the majority of the cases been employed and a flaky inorganic reinforcing material has rarely been used. The reinforcing material which has hitherto been used has an average size of, say, several microns if it is fibrous, or several tens of microns if it is flaky. The injection molded product reinforced with any such reinforcing material has the disadvantage of failing to present a sharply finished surface when it is painted.

A number of solutions have, therefore, been proposed. Japanese Laid-Open Patent Specifications No. 20717/1986 proposes the use of needle crystals of, for example, potassium titanate having an average size of 0.2 to 0.5 micron as a reinforcing material. Another proposal is to use transparent alumina or silica fibers having an average size not exceeding six microns. Because of their small size, however, the preparation of those crystals or fibers requires the use of a complicated process which makes them expensive. The injection molded products reinforced with any such crystals or fibers are, therefore, expensive.

SUMMARY OF THE INVENTION

Under these circumstances, it is an object of this invention to provide an improved method for the reaction injection molding of a reinforced plastic product which enables the use of an easily available inexpensive reinforcing material for manufacturing a product having on its surface when painted a sharp finish which is equal to, or even better than, what has hitherto been obtained only at a high cost.

This object is attained by a method which employs a flaky inorganic reinforcing material having an average size not exceeding 18 microns for manufacturing a reinforced injection molded product from a polyol or polyisocyanate, or a mixture thereof.

The use of a flaky inorganic reinforcing material having an average size not exceeding 18 microns makes it possible to obtain easily and inexpensively a product which will present a surface finish of high sharpness when painted. A painted surface of still better sharpness can be obtained if the reinforcing material which is employed has an average size not exceeding eight microns.

The reinforcing material can be selected from among natural or artificial flaky minerals, glass flakes and ceramic flakes. At least one of those kinds of materials is employed. Various combinations of materials can advantageously be used to achieve an appropriately controlled degree of sharpness on a painted surface.

Examples of the natural flaky minerals include mica of the composition $K_2Al_4(Si_3Al)_2O_{20}(OH)_4$, $K_2Mg_6(Si_3Al)_2O_{20}(OH)_4$ or $K_2(Mg \cdot Fe^{2+})_6(Si_3Al)_2O_{20}(OH)_4$. The use of natural mica is advantageous, as it is inexpensive and its flakes have an average size which is easy to control. Examples of the artificial flaky minerals include artificial mica.

Flakes of various kinds of glass can also be used. Examples of the ceramic flakes include flakes of alumina and silica.

The reinforcing material having an appropriate average size can be obtained by a customary method, for example, crushing a raw material and classifying the crushed material through a sieve or cyclone.

This invention can be carried out by employing any polyol or polyisocyanate or molding apparatus that is ordinarily used in the art to which this invention pertains.

BRIEF DESCRIPTION OF THE FIGURE

The figure is a graph showing the sharpness of the painted surface of each of the planar molded products obtained in examples of this invention and comparative examples which will hereinafter be described.

DETAILED DESCRIPTION OF THE INVENTION

The invention will now be described in further detail with reference to several examples thereof, which are not intended to limit the scope of the invention, as well as several comparative examples.

The following materials, molding and painting conditions, and testing method were employed for the examples of this invention and the comparative examples:

1. Reinforcing materials:

TABLE 1 shows the reinforcing materials which were employed. TABLE 2 shows their properties.

2. Material reinforced:

Polyurethane was employed.

Recipe "Bayflex 110-25":

Mixed polyol solution "J-380";

Isocyanate "Sumidul PF".

TABLE 3 shows the compositions of two solutions A and B which were employed for the reactive injection molding of reinforced products. Different Solutions A containing different kinds of reinforcing materials were employed. Each solution A was mixed by impingement with Solution B in a mold for the reaction injection molding of a reinforced product. Each molded product contained 10% by weight of reinforcing material.

TABLE 1

| | Reinforcing material | Reinforcing material Composition | Size |
|---|---|---|---|
| Example 1 | Kurarite mica 600W (tradename) of Kuraray Co., Ltd. (Japan) | Mica of the composition as stated above | Flaky, $D\bar{x} = 8\ \mu m$ and $T\bar{x} = 0.32$–$0.40\ \mu m$ |
| Example 2 | Kurarite mica 400W | Mica of the composition | Flaky, $D\bar{x} = 18\ \mu m$ and |

TABLE 1-continued

| | Reinforcing material | Reinforcing material Composition | Size |
|---|---|---|---|
| | (tradename) of Kuraray Co., Ltd. (Japan) | tion as stated above | $\overline{T}\overline{x} = 0.45-0.51\ \mu m$ |
| Comparative Example 1 | Suzorite mica 200HK (tradename) of Kuraray Co., Ltd. (Japan) | Mica of the composition as stated above | Flaky, $\overline{D}\overline{x} = 90\ \mu m$ and $\overline{T}\overline{x} = 1.6-1.8\ \mu m$ |
| Comparative Example 2 | Short glass fibers MFB (tradename) of Asahi Fiber Glass Co., Ltd. (Japan) | E glass | Fibrous, $\overline{D}\overline{x} = 10\ \mu m$ and $\overline{L}\overline{x} = 120\ \mu m$ |
| Comparative Example 3 | Ceramic fibers Ibiden (tradename) of Ibiden Co., Ltd. (Japan) | 50% $Al_2O_3$:50% $SiO_2$ (% by weight) | Fibrous, $\overline{D}\overline{x} = 2.2-2.5\ \mu m$ and $\overline{L}\overline{x} = 150-200\ \mu m$ |
| Comparative Example 4 | Potassium titanate whiskers Tismo D (tradename) of Otsuka Chemical Co., Ltd. (Japan) | $K_2O.6TiO_2$ | Fibrous, $\overline{D}\overline{x} = 0.2-0.5\ \mu m$ and $\overline{L}\overline{x} = 10-20\ \mu m$ |

Note:
$\overline{D}\overline{x}$: Average flake or fiber diameter;
$\overline{T}\overline{x}$: Average flake thickness;
$\overline{L}\overline{x}$: Average fiber length.

TABLE 2

| | Properties of reinforcing material | | | |
|---|---|---|---|---|
| | Average volume ($cm^3$) | Specific gravity ($g/cm^3$) | Average mass of particle (g) | Surface hardness (Mohs' scale) |
| Example 1 | $1.61 \times 10^{-11}$ to $2.01 \times 10^{-11}$ | 2.85 | $4.59 \times 10^{-11}$ to $5.73 \times 10^{-11}$ | 2.5 |
| Example 2 | $1.15 \times 10^{-10}$ to $1.30 \times 10^{-10}$ | 2.85 | $3.28 \times 10^{-10}$ to $3.71 \times 10^{-10}$ | 2.5 |
| Comparative Example 1 | $1.02 \times 10^{-8}$ to $1.15 \times 10^{-8}$ | 2.85 | $2.91 \times 10^{-8}$ to $3.28 \times 10^{-8}$ | 2.5 |
| Comparative Example 2 | $9.42 \times 10^{-9}$ | 2.54 | $2.39 \times 10^{-8}$ | 7.5 |
| Comparative Example 3 | $5.70 \times 10^{-10}$ to $9.82 \times 10^{-10}$ | 2.60 | $1.48 \times 10^{-9}$ to $2.55 \times 10^{-9}$ | 6.0 |
| Comparative Example 4 | $3.14 \times 10^{-13}$ to $3.93 \times 10^{-12}$ | 3.30 | $1.04 \times 10^{-13}$ to $1.30 \times 10^{-12}$ | 4.0 |

TABLE 3

| Solution | Constituent (tradename) | Manufacturer | Part or parts by weight |
|---|---|---|---|
| A | Polyol J-380 | Sumitomo Bayer Urethane Co. Ltd., Japan | 100 |
| | Dibutyltin dilaurate | Nitto Chemical Co., Ltd., Japan | 0.1 |
| | Dabco 33LV | Sankyo Air Product Co., Ltd., Japan | 0.1 |
| | Reinforcing material (TABLE 1) | — | 16.4 |
| B | Sumidur PF | Sumitomo Bayer Urethane Co., Ltd., Japan | 46.2 |

TABLE 4

| | Pouring rate (cc/sec.) | | | | | |
|---|---|---|---|---|---|---|
| Solution | Example 1 | Example 2 | Comparative Example 1 | Comparative Example 2 | Comparative Example 3 | Comparative Example 4 |
| A | 305 | 305 | 305 | 307 | 306 | 303 |
| B | 112 | 112 | 112 | 112 | 112 | 112 |

3. Pouring material:

A two-component booster cylinder type pouring material was employed. Solutions A and B were mixed by impingement at the pouring rate shown in TABLE 4 for each example or comparative example.

4. Mold:

A steel mold was used. It had a cavity so sized as to be capable of making a planar molded product having a width of 400 mm, a length of 600 mm and a thickness of 3 mm. The inner surface of the mold defining its cavity was one which had been finished with a compound having a particle size of 1000 meshes and coated with chromium.

Each of the molded products which has been obtained was painted and it painted surface was examined for sharpness, as will hereinafter be described.

5. Painting:

The surface of each product was painted by a method comprising the following steps:

(1) Degreasing by washing with vapors of 1,1,1-trichloroethane;

(2) Undercoating by forming a film of a two-part polyurethane paint having a thickness of 47.5±2.5 microns, followed by baking at 80° C. for 20 minutes; and (3) Overcoating by forming a film of a one-part polyurethane paint having a thickness of 42.5±2.5 microns, followed by baking at 120° C. for 30 minutes.

6. Examination of sharpness;

The painted surface of each product was examined by a portable luster sharpness tester made by Tokyo Photoelectric Co., Ltd., Japan. The results are shown in the drawing. The painted surfaces of the products of Examples 1 and 2 showed sharpness values of 0.55 and 0.35, respectively, which were by far higher than the value of 0.25 obtained from Comparative Examples 1 and 2. The results of Example 1 were at least comparable to those of Comparative Examples 3 and 4 in which inorganic fibers of small size had been used as the reinforcing material. The results of Example 2 were not so good as those of Comparative Example 3 or 4, but were acceptably close to them.

The inorganic fibers of small size which are used by the conventional method require a complicated process for preparation and are, therefore, expensive. The fibers used in Comparative Example 3 were prepared by a process comprising the steps of raw material melting, blowing and classification. The fibers used in Comparative Example 4 were prepared by a process comprising the steps of raw material melting and needle crystal forming. On the other hand, the method of this invention enables the use of an inexpensive flaky inorganic material which is easy to be obtained by crushing and classification. The mica used in Examples 1 and 2 enables a further reduction of cost, as it is a natural flaky inorganic substance.

What is claimed is:

1. In a method for the reaction injection molding of a reinforced planar product from at least one reaction product of at least one polyol and at least one polyisocyanate; and at least one reinforcing material, the improvement comprising employing as said reinforcing material a flaky mica having an average diameter ranging from eight to eighteen microns, overcoating said planar product with polyurethane, baking the same and leaving it to be cooled.

2. A reinfoced planar product of high sharpness produced by reaction injection molding wherein said reinforced product comprises at least one reaction product of at least one polyol and at least one polyisocyanate; and at least one reinforcing material, wherein said reinforcing material is a flaky mica having an average diameter ranging from 8 to 18 microns and wherein said product is coated with polyurethane, baked and left to be cooled.

* * * * *

UNITED STATES PATENT AND TRADEMARK OFFICE
CERTIFICATE OF CORRECTION

PATENT NO.  : 5,079,084

DATED       : January 7, 1992

INVENTOR(S) : Kanemitsu Kondo

It is certified that error appears in the above-identified patent and that said Letters Patent is hereby corrected as shown below:

On the title page, under item [19], "et al." should be deleted; and in item [75], after the "Inventors:", delete "Yoshiro Umemoto, Nagoya, both of".

On the title page, item [54] and col. 1, line 1, "REACTIVE" should read --REACTION--.

Signed and Sealed this

Thirteenth Day of April, 1993

Attest:

STEPHEN G. KUNIN

*Attesting Officer*  *Acting Commissioner of Patents and Trademarks*